March 15, 1960  R. L. SPENCER ET AL  2,928,682
OCCUPANT PROPELLED VEHICLE WITH PASSENGER SUPPORT
Filed Dec. 6, 1957  3 Sheets-Sheet 1
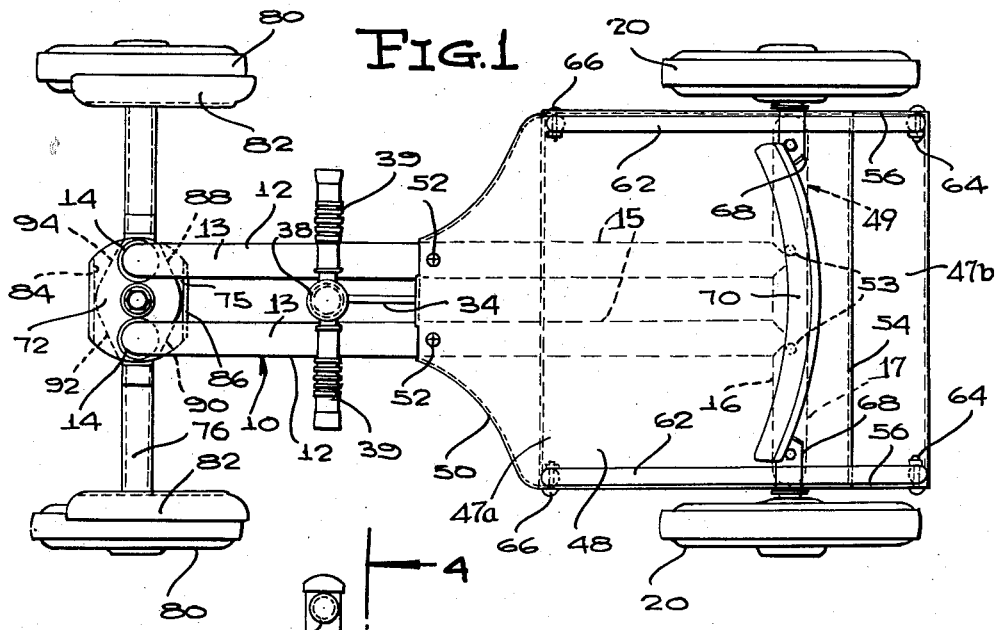
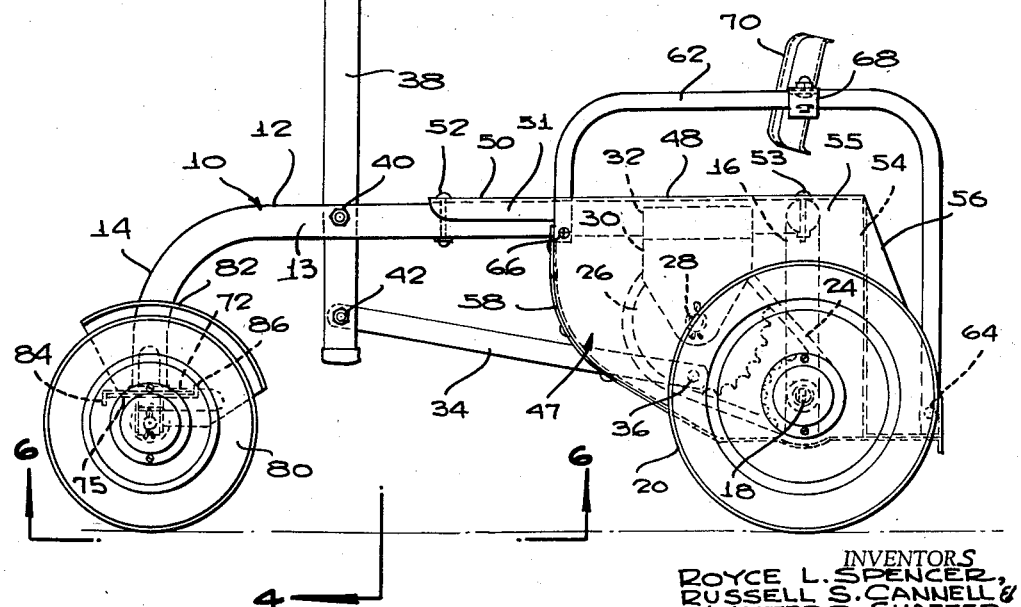
INVENTORS
ROYCE L. SPENCER,
RUSSELL S. CANNELL &
BY WALTER B. SHAFFER
McMorrow, Berman & Davidson
ATTORNEYS

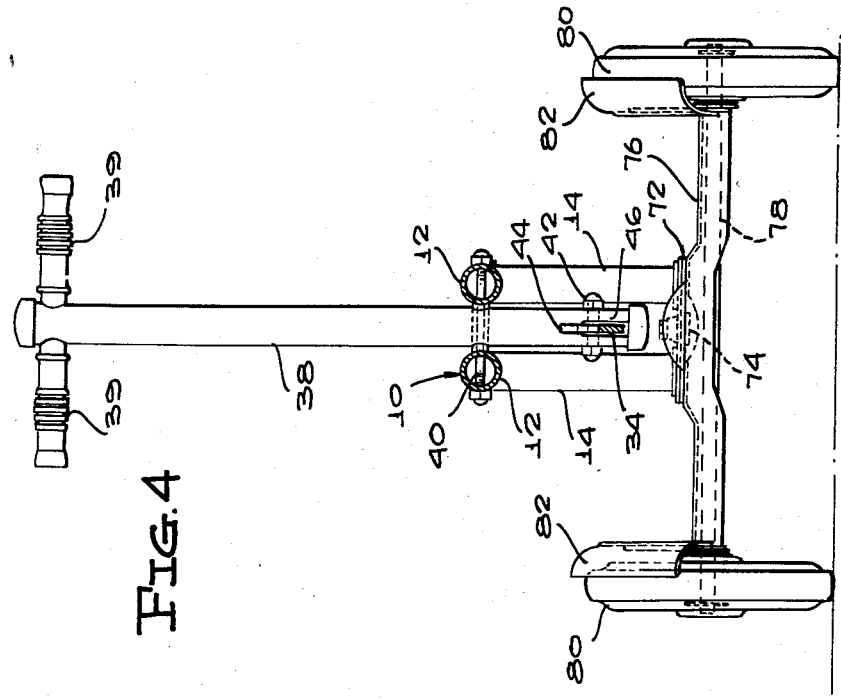
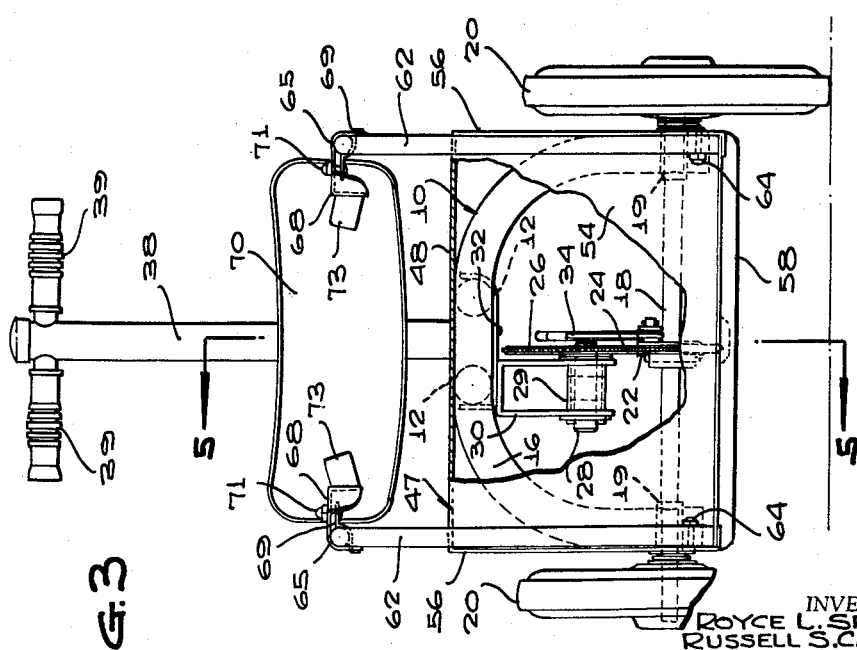

March 15, 1960 R. L. SPENCER ET AL 2,928,682
OCCUPANT PROPELLED VEHICLE WITH PASSENGER SUPPORT
Filed Dec. 6, 1957 3 Sheets-Sheet 3
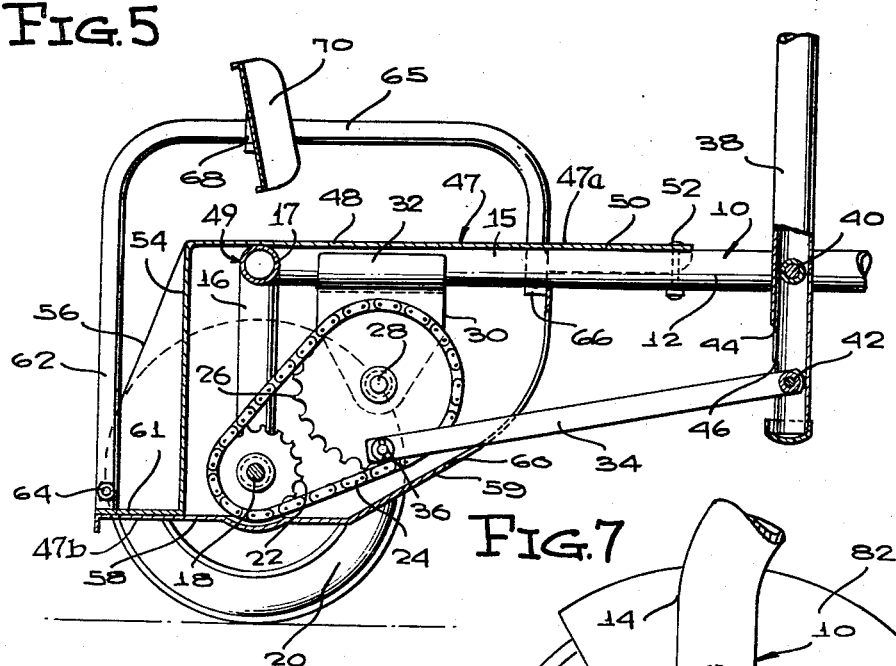
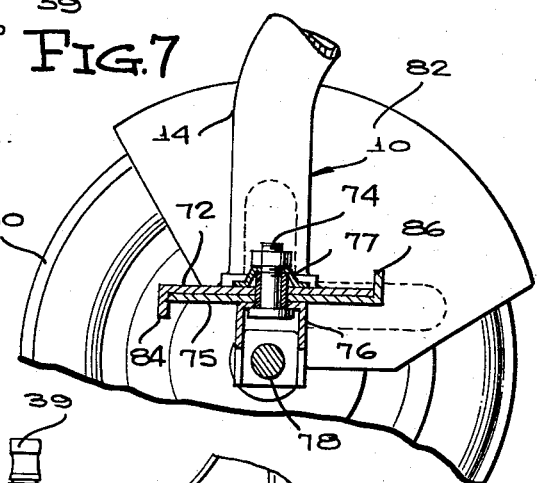
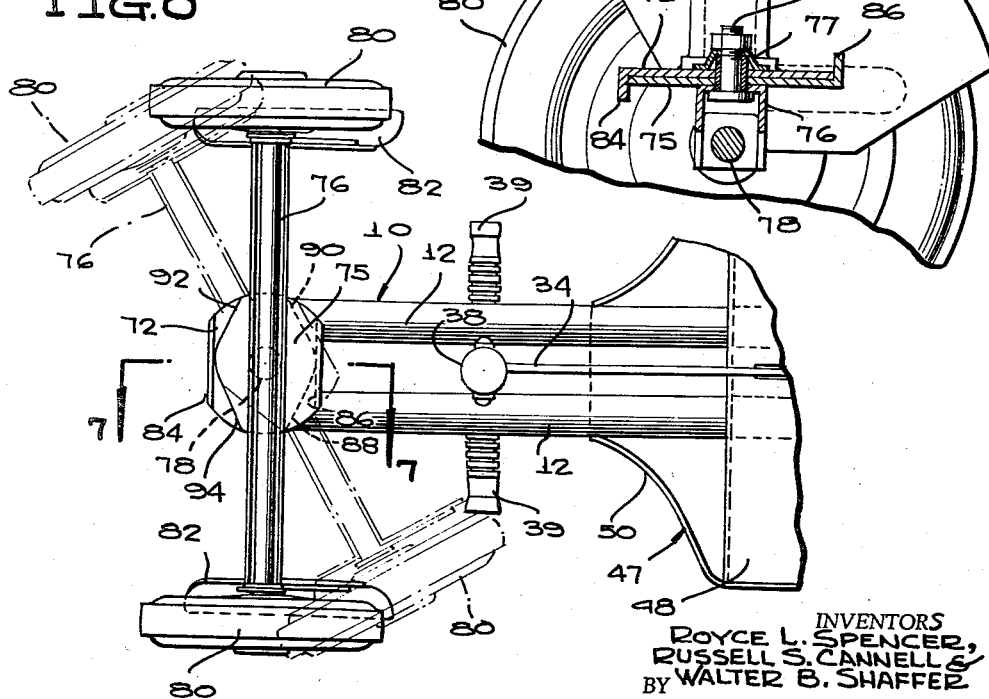
INVENTORS
ROYCE L. SPENCER,
RUSSELL S. CANNELL &
BY WALTER B. SHAFFER
ATTORNEYS

United States Patent Office 2,928,682
Patented Mar. 15, 1960

2,928,682

OCCUPANT PROPELLED VEHICLE WITH PASSENGER SUPPORT

Royce L. Spencer, Douglassville, Russell S. Cannell, Birdsboro, and Walter B. Shaffer, Reading, Pa.

Application December 6, 1957, Serial No. 701,181

3 Claims. (Cl. 280—202)

This invention relates generally to vehicles, and more particularly to a vehicle to be used by children.

One object of importance is to provide a vehicle that will have an improved framing structure.

Another object is to associate, with the improved framing structure, a generally improved assembly providing a seat for the rider, a support platform for a passenger, and housing means for the drive mechanism of the vehicle.

Another object of importance is to associate, with the seat and housing means, guard rails extending along the sides of the vehicle that will be designed to provide hand holds for the passenger, while at the same time providing protection along the sides of the vehicle operator.

Still another object is to support, upon the guard rails, a novel, improved back rest adapted for adjustment in a fore-and-aft direction while extending transversely of the vehicle, to selected positions, according to the desires of the vehicle operator.

A further object is to provide an improved steerable front wheel assembly, which will be particularly and novelly designed for providing positive stops limiting swiveling of the front axle during steering of the vehicle to an extent such that the axle cannot be moved to a point where a child can pinch his foot or ankle between the frame of the vehicle and a front wheel.

A further object is to provide, in the drive mechanism, an arrangement between the driving components such as to provide for maximum smoothness and ease of operation.

Other objects will appear from the following description, the claims appended thereto, and from the annexed drawing, in which like reference characters designate like parts throughout the several views, and wherein:

Figure 1 is a top plan view of a toy vehicle according to the present invention;

Figure 2 is a side elevational view thereof;

Figure 3 is a rear elevational view of the vehicle in which portions have been broken away;

Figure 4 is a transverse sectional view on line 4—4 of Figure 2;

Figure 5 is a fragmentary longitudinal sectional view, substantially on line 5—5 of Figure 3;

Figure 6 is a fragmentary bottom plan view showing the steerable front wheel assembly in different positions to which it may be moved, in full and dotted lines; and Figure 7 is an enlarged, detail sectional view substantially on line 7—7 of Figure 6.

Referring to the drawing in detail, designated generally at 10 is the support frame of the vehicle constituting the present invention.

Frame 10 includes a pair of closely, laterally spaced, elongated longitudinal frame members 12 of tubular material, extending in parallel relation at opposite sides of and symmetrically in respect to the longitudinal median line of the vehicle. At their fore portions 13, the frame members 12 are integrally formed with vertically depending extensions 14. At their aft portions 15, frame members 12 have a fixed connection to the bight portion of a rear axle support yoke 16 of inverted U-shape (see Figure 3), said support yoke being disposed wholly in a vertical plane normal to the lengths of members 12, with the bight part 17 of the yoke and the aft portions lying in a common horizontal plane.

A rear axle 18 is journalled in suitable bushings or bearings 19 (see Figure 3) mounted in the lower ends of the legs of yoke 16, and carried on the opposite ends of axle 18 are the rear wheels 20.

Referring to Figure 5, a drive mechanism for the device is of the type wherein a motion-translating connection is provided between an operating lever rocked back and forth by the vehicle operator, and the drive axle 18. To this end, there is provided a driven sprocket 22, connected to the drive axle 18 for rotation therewith, it being understood that wheels 20 would also be connected to the axle 18 for rotation therewith. Trained about the driven sprocket 22 is a drive chain 24 extending forwardly upwardly from the sprocket 22 and trained about a larger, drive sprocket 26 mounted on a stub shaft 28 extending through a bushing 29 disposed between the legs of a support bracket or hanger 30 of inverted U-shape, having transversely aligned openings through which the stub shaft 28 extends. Hanger 30 is fixedly secured at its upper end to a support bracket 32 formed as a shallowly U-shaped member underlying the respective frame members 12 in embracing relation thereto (see Figure 3), and fixedly secured to said members 12.

An elongated drive link 34 extends in a fore-and-aft direction, below the members 12, medially between and symmetrically in respect to said members 12 (see Figure 3). At its rear end, link 34 has a pivotal connection at 36 to the marginal portion of the drive sprocket 26.

An operating lever 38 extends upwardly from the forward end of the drive link, between members 12, and is in the form of an elongated, straight tube provided at its upper end with a transversely disposed handle or hand grip 39.

Adjacent its lower end, lever 38 has a transverse opening receiving a pivot pin 40 that is extended between the members 12, as shown in Figure 4, providing a horizontal, transverse axis for the lever whereby the lever swings in a vertical plane passing through the longitudinal median line of the frame and including the drive link 34, which is connected at its forward end pivotally to the lower end of the lever 38 by means of a pin 42. The forward end of the drive link 34 extends through a longitudinal slot 44 having a wider lower end portion 46.

By reason of this arrangement, it will be seen that on oscillation of the lever 38 by the vehicle operator about the pivot 40, a reciprocating motion of the drive link 34 will result, in turn translated into a rotary motion of each sprocket 26. The vehicle can be driven either forwardly or rearwardly, of course, by the child.

A combined seat, passenger support, and drive mechanism housing generally designated at 47 has forward and rear end portions 47a, 47b, respectively, these being respectively disposed forwardly and rearwardly of the bight part 17. Housing 47 includes a horizontal seat panel 48 supported upon a T-shaped section 49 of the frame, defined by the perpendicularly related bight part 17 and aft portions 15. Seat panel 48 is of substantial width over the greatest part of its area, while having a progressively forwardly reduced extension 50 at its front end providing clearance for the child's legs. The opposite sides of the extension 50 are dependingly flanged as at 51, and screws 52 are extended through the extensions 50 and through the respective members 12 to fixedly secure the seat panel at its forward end to the frame. Additional screws are extended through the seat panel at 53 (see Figure 1) fixedly securing the same to the yoke 16.

Integral with the seat panel 48 at the rear edge of the seat panel is a vertically depending back wall or panel 54. The combination seat and housing 47 further includes side walls 55 and at their rear ends, these have triangular extensions 56 projecting beyond the back panel 54 to provide guards for protecting a passenger from accidental contact with the rear wheels 20.

Housing 47 also includes a bottom wall 58 (Figure 5) merging into an inclined front wall 59 of the housing. The bottom wall of the front wall extends below and forwardly of the drive mechanism, and formed in the front wall 59 is a slot 60 through which the link 34 extends. The back wall 58 is extended rearwardly beyond panel 54 and panel 54 is formed with a rear, horizontal extension 61 in contact with the bottom wall 58 and fixedly secured thereto. This provides a rear, transversely extending ledge or passenger support platform of double thickness, on which a passenger may stand.

Guard rails 62 are also included in the vehicle, extending along opposite sides of the housing 47. The guard rails 62 are of inverted J-shape, having long rear legs bolted at 64 to the rearwardly projecting, triangular extensions 56 of side walls 55. The rear legs of the guard rails are vertically disposed, and provide protection at the sides of the standing passenger.

At their upper ends, the rear legs of the guard rails merge into horizontally extending back rest support members 65, constituting the bight portions of the guard rails 62. In turn, members 65 merge at their forward ends into vertically depending, short front legs of the guard rails secured by bolts 66 to the side walls 55.

The guard rails 62 and the housing 47 mutually interact to rigidify the construction, and it will be noted that the guard rails protect not only the standing passenger, but also, the vehicle operator, who would be seated upon the panel 48 between the horizontal members 65.

Confronting, adjustable back rest support brackets are mounted upon the respective members 65 and are adjustable longitudinally of said members 65. The brackets include upper bracket members 68, in overlying relation to the members 65, and further include lower bracket members 69 underlying the members 65 and pivotally connected to the members 68. Carriage bolts 71 extend through the bracket members 68, 69, so as to clampably engage the same with the back rest support members 65 in selected positions of adjustment in a fore-and-aft direction.

A back rest 70 extends transversely between the guard rails, above the seat panel, and is rearwardly bowed as shown in Figure 1 to provide maximum comfort for the vehicle operator. The bracket members 68 have ears 73 that are fixedly secured to the back surface of the back rest 70. As a result, the back rest can be adjusted forwardly or rearwardly, to selective positions, thereby to allow a quick and simple adjustment for the leg length of each child.

Referring now to the front wheel assembly, this is a steerable assembly, and is operated by the seat of the child seated upon panel 48. While such a steering arrangement is of course broadly old, the particular arrangement embodied in the invention provides safety stop means, designed to insure against injury to the child while still permitting sharp "cornering."

The front wheel assembly includes superposed plates 72, 75 disposed in face-to-face contact (Figure 7) and lying in horizontal planes. Plate 72 is welded to the lower ends of the extensions 14 of frame members 12. Plate 75 is welded or otherwise fixedly secured to the top surface of the mid-length portion of a front axle support member 76 having the form of a downwardly opening channel. Registering openings are formed in the plates 72, 75 receiving a pivot bolt 74, that extends also through a pivot washer 77.

Extending within the front axle support member 76 is a front axle 78, the ends of which extend through openings provided in end walls of member 76. Carried by the front axle are front wheels 80.

Front fenders 82 are mounted in overlying relation to the inner surfaces of the wheels 82 and protect the feet of the child against accidental contact with the front wheels during operation of the vehicle.

The plates 72, 75 have particular shapes designed to provide stops limiting swinging of the front axle about the axis defined by the pin 74. Referring to Figure 7, plate 72 at its forward edge has a depending flange 84 while plate 75 at its rear edge has an upwardly projecting flange 86.

The flanges extend transversely of the device, with flange 84 extending perpendicularly to the longitudinal median line of frame 10, and with flange 86 extending parallel to the length of the steerable front axle 78.

The formation of the edges of the plates opposite those on which the flanges are provided is of importance. The rear edge of plate 72 (see Figure 1) has rearwardly convergent edge surfaces 88, 90 disposed at a wide obtuse angle to each other and at acute angles to the longitudinal median line of the frame.

Plate 75 is oppositely but identically formed to the plate 72, and has a forward edge formed with obtusely related edge surfaces 92, 94.

Thus, each plate has a transversely extending stop flange at one end, and a bluntly pointed opposite end, the stop flanges extending in opposite directions with the flange of each plate extending across the plane of the other plate as shown in Figure 7.

As a result, when the vehicle is steered, it will be limited against movement in opposite directions from the normal position shown in full lines in Figure 6. Consider for example that the child shifts the steerable axle to the dotted line position of Figure 6. Plate 75 will turn therewith to the dotted line position in this figure of the drawing. Therefore, the upwardly projecting stop flange 86 of plate 75 will extend in longitudinally contacting relation to edge surface 90 of plate 72. Further, edge surface 92 of plate 75 will similarly extend in longitudinally contacting relation to the depending stop flange 84 of plate 72.

It will thus be seen that a desirable safety feature is incorporated in the steering mechanism, limiting steering in opposite directions by a relatively simple arrangement which has the further desirable characteristic of increasing to a marked degree the total area of contact between the relatively rotatable portions of the mechanism. Reference is here had to the total area of contact between plates 72 and 75. Plate 72 in effect is part of the relatively stationary support frame 10, while plate 75 in effect is part of the swiveled steering mechanism. By providing a substantial area of contact between these components, stability of the entire device is increased measurably without loss of maneuverability.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A toy vehicle comprising a support frame including a generally horizontal intermediate part extending in a fore-and-aft direction, and front and rear parts depending from opposite ends of said intermediate part; a rear wheel assembly carried by the rear part of the frame; a steerable front wheel assembly carried by the front part thereof; a drive mechanism supported from the intermediate part in driving relation to the rear wheel assembly, a combined seat and drive mechanism housing mounted upon the intermediate and rear parts of the frame; a pair of guard rails fixedly secured to said combined seat and housing and extending along opposite sides thereof so as to provide abutments at opposite sides of a vehicle operator supported upon the combined seat and housing, said guard rails being of approximately inverted J-shape and including short front legs secured to the front portion of said housing, the housing having a rearwardly projecting transversely extending ledge providing a platform for support of a passenger at the rear end of the housing, said guard rails including elongated rear legs fixedly secured to said ledge; and a back rest extending transversely between the guard rails, the guard rails including horizontally disposed bight portions spaced upwardly from said combined seat and housing, said back rest at its opposite ends being connected to the bight portions for adjustment longitudinally of the bight portions.

2. A toy vehicle comprising: a support frame including at least one frame member extending in a direction fore-and-aft of the vehicle, the fore portion of said member being formed with a depending extension and the aft portion thereof lying in a horizontal plane, and a rear axle support yoke of inverted U-shape the bight part of which lies in said plane and is fixed to said aft portion perpendicularly to the length thereof, thus defining in cooperation with the aft portion a T-shaped, horizontally disposed section of the support frame; front and rear wheel assemblies respectively mounted on said extension and yoke; a drive mechanism carried by the support frame and extending to one of said assemblies in driving relationship thereto; a combined passenger support and drive mechanism housing having forward and rear end portions projecting forwardly and rearwardly, respectively, from said bight part, said housing at least partially enclosing the drive mechanism and including a seat panel overlying and fixed to said frame section; a pair of wholly rigid guardrails extending along the opposite sides of and fixed at their opposite ends to the respective, corresponding end portions of the housing; a pair of identical but opposite support brackets mounted upon the respective guardrails, said rails including parallel, horizontal portions elevated above the seat panel, the brackets receiving said horizontal portions of the rails and being adjustable therealong; and a back rest connected between the brackets and extending transversely of the seat panel above and in spaced relation to the seat panel.

3. A toy vehicle comprising: a support frame including at least one frame member extending in a direction fore-and-aft of the vehicle, the fore portion of said member being formed with a depending extension and the aft portion thereof lying in a horizontal plane, and a rear axle support yoke of inverted U-shape the bight part of which lies in said plane and is fixed to said aft portion perpendicularly to the length thereof, thus defining in cooperation with the aft portion a T-shaped, horizontally disposed section of the support frame; front and rear wheel assemblies respectively mounted on said extension and yoke; a drive mechanism carried by the support frame and extending to one of said assemblies in driving relationship thereto; a combined passenger support and drive mechanism housing having forward and rear end portions projecting forwardly and rearwardly, respectively, from said bight part, said housing at least partially enclosing the drive mechanism and including a seat panel overlying and fixed to said frame section; a pair of wholly rigid guardrails extending along the opposite sides of and fixed at their opposite ends to the respective, corresponding end portions of the housing; a pair of identical but opposite support brackets mounted upon the respective guardrails, said rails including parallel, horizontal portions elevated above the seat panel, the brackets receiving said horizontal portions of the rails and being adjustable therealong; a back rest connected between the brackets and extending transversely of the seat panel above and in spaced relation to the seat panel; a back panel extending downwardly from the rear end of the seat panel; and a rearwardly, horizontally extending ledge projecting rearwardly from the lower end of the back panel at said rear end portion of the housing, the respective guardrails including front and rear legs extending downwardly from the opposite ends of the horizontal portions thereof, said rear legs of the guardrails being secured to said ledge and the front legs being secured to said front end portion of the housing.

References Cited in the file of this patent

UNITED STATES PATENTS

| | | |
|---|---|---|
| 1,400,917 | Spaulding | Dec. 20, 1921 |
| 1,432,893 | Peters | Oct. 24, 1922 |
| 1,606,269 | Stack | Nov. 9, 1926 |
| 1,800,668 | Shaver | Apr. 14, 1931 |
| 1,820,474 | Molinari | Aug. 25, 1931 |
| 2,107,722 | Vimeux | Feb. 8, 1938 |
| 2,153,766 | McGregor | Apr. 11, 1939 |
| 2,173,520 | Klatt | Sept. 19, 1939 |
| 2,311,424 | Weller | Feb. 16, 1943 |